United States Patent Office 3,451,959
Patented June 24, 1969

3,451,959
REACTION PRODUCTS OF STABILIZED ROSIN AMINE AND EPOXY RESINS
Kurt J. Wasserman, 341 E. Skyline Lakes Drive, Wanaque, N.J. 07465
No Drawing. Continuation-in-part of application Ser. No. 436,932, Mar. 3, 1965. This application June 29, 1967, Ser. No. 649,818
Int. Cl. C08g 30/14
U.S. Cl. 260—24         7 Claims

ABSTRACT OF THE DISCLOSURE

A resinous reaction product produced by reacting stabilized rosin amines with epoxy resins to formulate surface coatings and adhesives.

---

This application is a continuation-in-part application of U.S. patent application Ser. No. 436,932, filed Mar. 3, 1965 now abandoned.

FIELD OF INVENTION

The present invention relates to resinous reaction products and, more particularly, to such reaction products which have many useful applications as, for example, forming high strength adhesives, durable coatings and potting compounds.

SUMMARY OF THE INVENTION

In accordance with the present invention, it has been discovered that such products can be produced by reacting stabilized rosin amines with epoxy resins to formulate surface coatings and adhesives to comply with specific requirements.

The epoxy resins suitable for use in connection with this invention primarily are reaction products of polynuclear polyhydroxy phenols or mononuclear dihydroxy and trihydroxy phenols and halohydrins or diepoxy compounds derived by the treatment of unsaturated hydrocarbons and peroxygen compounds. Such reaction products have a hydroxyl number between 50 and 150. One of the most useful classes of epoxy resins is that derived from bis(4-hydroxyphenol) dimethylmethane and epichlorohydrin. These epoxy resins may be prepared at various molecular weights depending on the mol ratio of the reactants used. The mol ratio of epichlorohydrin to bis (4-hydroxyphenol) dimethylmethane may vary from 2/1 to 1.1/1, where the lower mol ratio yields higher molecular weight resins. The manufacture of such epoxy resins is described in U.S. Patents 2,538,072 and 2,694,694.

The stabilized rosin amines suitable for use in connection with this invention are primary amines derived from various rosins and rosin acids by conversion of the carboxylic acid groups to primary amino groups. These rosin amines include derivatives of gum and wood rosin containing chiefly abietyl amine, derivatives of dehydrogenated rosin containing chiefly dihydroabietyl and tetrahydroabietyl amines, derivatives of heat treated rosin, derivatives of polymerized rosin, derivatives of summarized rosin containing substantial amounts of abietyl amine and derivatives of pure rosin acids, namely, abietyl amine, dehydroabietyl amine and tetrahydroabietyl amine. The preparation of such rosin amines is described in U.S. Patents 2,510,295 and 2,776,955.

DESCRIPTION OF PREFERRED EMBODIMENTS

In use, the application of stabilized rosin amines with the epoxy resins is usually carried out by blending the components, with or without the addition of suitable solvents, and applying the resultant mixtures before curing or reaction takes place. These mixtures may be catalyzed to enhance rate and degree of cure by the use of tertiary amines as catalysts. The most useful catalysts are benzyl-dimethylamine, tri-(N,N-dimethyl amino methyl)-phenol, dimethyl amino methyl phenol, pyridine and triethylamine. The mixture contains 0.5% to 20% by weight of catalyst. By the use of certain co-reactants the properties of products such as a coating or an adhesive may be varied over a wide range. The most useful co-reactants are monofunctional and polyfunctional primary or secondary amines and polyamides. From 5% to 25%, by weight of the resin, of such amines are used. With the choice of the proper co-reactant such properties as flexibility, solvent resistance, rate of cure and specific adhesion may be adjusted to suit particular applications.

Uncatalyzed reaction mixtures have shown shelf stability for several months, whereas the utilization of a catalyst can produce reaction mixtures which cure quickly even at room temperature.

The following examples illustrate the manner of practicing the present invention.

Example I 100 grams of dehydroabietyl amine were placed in a stainless steel beaker fitted with an agitator and a thermometer and were heated to 40° C. to reduce viscosity. To the warm dehydroabietyl amine were added 95 grams of an epoxy resin prepared from epichlorohydrin and (4-hydroxyphenol) dimethylmethane "bisphenol-A" and having a molecular weight of about 375. The mixture was agitated for several minutes and then applied to steel test panels, which were cured by a heat treatment at about 120° C. for twenty minutes. The resultant coating was clear, glossy and had excellent adhesion to the metal substrate. "Bisphenol-A" is defined as diglycidyl ether of 2,2-bis(4-hydroxyphenol)propane.

Example II 95 grams of dehydroabietyl amine were placed in a stainless steel beaker fitted with an agitator and a thermometer and were heated to reduce viscosity. To the warm dehydroabietyl amine were added 95 grams of epoxy resin, prepared from epichlorohydrin and (4-hydroxyphenol) dimethylmethane "bisphenol-A" and having a molecular weight of about 375 and 5 grams of tri-(N,N-dimethylamino methyl)-phenol. The mixture was agitated for several minutes and then immediately applied to steel test panels, some of which were bonded together to test adhesive strength. The test panels were cured by a heat treatment at about 120° C. for five minutes. The coating composition showed high adhesive strength, good gloss and abrasion resistance.

EXAMPLE III

The preparation of dry resin, which exhibits solubility in solvents and can be cured further by the addition of catalysts or the application of heat to insoluble solvent coatings may also be prepared as illustrated by the following example:

100 grams of dehydroabietyl amine were placed in a stainless steel beaker fitted with an agitator and a thermometer and were heated to 90° C. To the hot dehydroabietyl amine were added 175 grams of epoxy resin, prepared from epichlorohydrin and (4-hydroxyphenol) dimethylmethane "Bisphenol-A" and having a molecular weight of about 900. The reaction mixture was maintained at 90° C. to produce a liquid, was agitated for ten minutes, slowly heated to 135° C., and was then poured onto a stainless steel tray and allowed to cool. The resultant product was a hard resin having a softening point of 105° C. and having solubility in toluene, methyl ethyl ketone, and naphtha.

Through the use of co-reactants the physical properties of the resinous products of stabilized rosin amine and epoxy resin may be modified to enhance flexibility, adhesion, etc.

Example IV

The following example illustrates a coating formulation which shows good flexibility:

160 grams of dehydroabietyl amine and 40 grams of polyglycol amine H-221 (di (3-aminopropyl) ether of diethylene glycol having the formula NH$_2$—CH$_2$CH$_2$CH$_2$—O(CH$_2$—
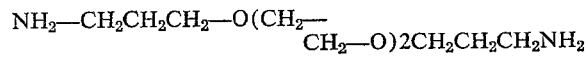
CH$_2$—O)2CH$_2$CH$_2$CH$_2$NH$_2$ and having a molecular weight of 220.31 and specific gravity at 20/20° C. of 1.0075) were placed in a stainless steel beaker fitted with agitator and thermometer. To this mixture of amines were added 180 grams of an epoxy resin, prepared from epichlorohydrin and "Bisphenol-A" and having a molecular weight of about 375. The resulting mixture was agitated at 40° C. for several minutes and was then applied to steel test panels which were cured at about 120° C. for twenty minutes. The coating showed better flexibility than can be achieved by the use of dehydroabietyl amine and epoxy resin alone.

Example V

To illustrate the versatility of the reaction products of this invention, a pigmented coating formulation having prolonged shelf stability was prepared in accordance with the following example.

The following components were placed in a ball mill by weight:

| | Parts by weight |
|---|---|
| Butyl Cellosolve | 107.5 |
| Xylene | 138.0 |
| Diacetone alcohol | 25.0 |
| Methyl isobutyl ketone | 40.0 |
| Araldite 6030 [1] | 190.0 |
| Dehydroabietyl amine | 170.0 |
| Titanium dioxide | 170.0 |
| Silica | 27.0 |
| Phthalocyamine blue | 60.0 |

[1] An epoxy resin made by reacting epichlorohydrin with (4-hydroxyphenol)-dimethylmethane and which has the following properties: (1) epoxide equivalent, 225; (2) Gardner color at 25° C., 5; (3) viscosity at 25° C., 35,000 centipoise.

After tumbling for six hours, the coating formulation was removed from the ball mill and coated onto steel test panels using a #18 wire-wound rod. The coated panels were cured for thirty minutes at about 120° C. The cured coating had excellent gloss and abrasion resistance. It had exceptional bacteriostatic and fungicidal properties. Furthermore, its protection against salt water corrosion was outstanding.

It will be understood that the details and examples hereinbefore set forth are illustrative only, and that the invention, as broadly described and claimed, is in no way limited thereby.

What is claimed is:
1. A process for producing a resin comprising reacting at a temperature above 40° C.
   (A) from 0.5 to 2 parts of a primary rosin amine having a ring structure of a stabilized rosin acid selected from the group consisting of:
      (1) dehydroabietic acid,
      (2) dihydroabietic acid,
      (3) tetrahydroabietic acid,
      (4) polyabietic acid, and
      (5) mixtures of (1) to (4), with
   (B) 1 part of an epoxy resin formed by reacting
      (1) 1.1 to 2 parts of epichlorohydrin with
      (2) 1 part of a bisphenol.
2. The product produced by the process of claim 1.
3. The process of claim 1, where in addition to (A) and (B) from 5% to 25%, by weight of the resin, of a compound selected from the group consisting of monofunctional and polyfunctional primary and secondary amines is added to the mixture of (A) and (B) prior to reaction thereof.
4. The product produced by the process of claim 3.
5. The process of claim 1, where in addition to (A) and (B), from 0.5% to 20%, by weight of the resin, of a compound selected from a group of aliphatic and aromatic teritary amines is added to act as a catalyst to the mixture of (A) and (B) prior to reaction thereof.
6. The product of claim 2 coated on a solid substrate.
7. The product of claim 4 coated on a solid substrate.

References Cited

UNITED STATES PATENTS

| 2,510,295 | 6/1950 | Rosher | 260—100 |
| 2,623,870 | 12/1952 | Sanders | 260—567.6 |
| 2,776,955 | 1/1957 | Rosher | 260—100 |

OTHER REFERENCES

Lee et al.: "Epoxy Resins," McGraw-Hill Book Co., pp. 17–20 relied on.

"Rosin Amine D and its Derivatives," bulletin of Hercules Powder Co., 1952, Bulletin No. 400–455 (pp. 3 and 11 relied upon).

DONALD E. CZAJA, Primary Examiner.

W. E. PARKER, Assistant Examiner.

U.S. Cl. X.R.

117—132; 161—213, 223; 260—47, 102; 424—34